Figure 1:
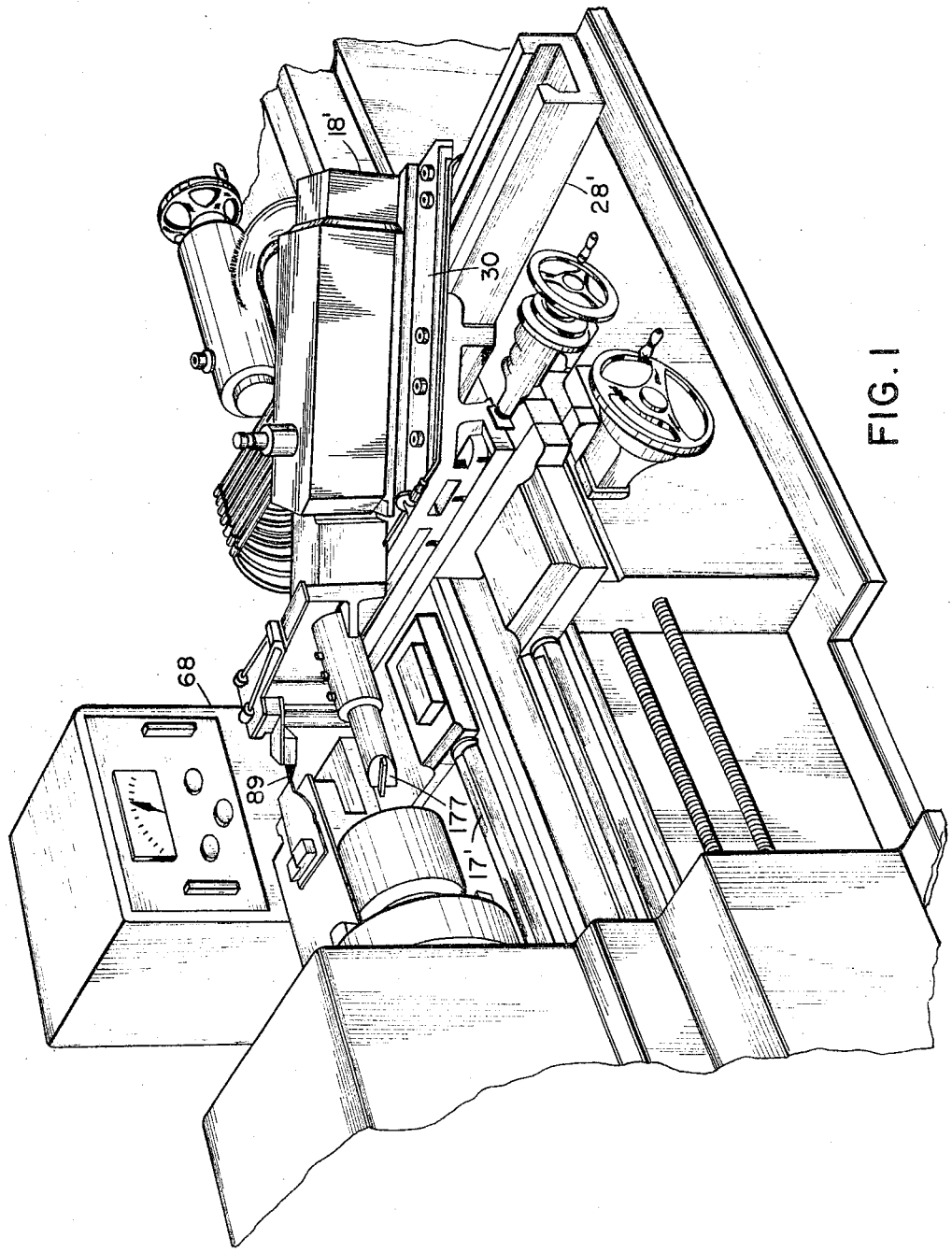

INVENTOR.
Victor M. Hovis, Jr.

Aug. 30, 1966  V. M. HOVIS, JR  3,269,232
SYSTEM FOR COORDINATING THE OPERATIONS OF A TOOL WITH A PATTERN
Filed Jan. 28, 1964  3 Sheets-Sheet 3

INVENTOR.
Victor M. Hovis, Jr.
BY
ATTORNEY.

United States Patent Office 3,269,232
Patented August 30, 1966

3,269,232
SYSTEM FOR COORDINATING THE OPERATIONS
OF A TOOL WITH A PATTERN
Victor M. Hovis, Jr., Kingston, Tenn., assignor to the
United States of America as represented by the United
States Atomic Energy Commission
Filed Jan. 28, 1964, Ser. No. 340,834
5 Claims. (Cl. 82—14)

This invention relates to a positioning control system for a tool and more particularly to the coordination of the movement of a tool with control means in order to conform to a pattern, and is an improvement over the duplicator lathe of the patent to Turchan et al., No. 2,603,117.

The present invention is concerned with the problems of ultra precision machining of surfaces to make them conform more nearly to the ideal geometrical configuration sought, i.e., the formation of surfaces with tolerances varying from near zero to 25 microinches from the ideal. In contrast, deviations in conventional machining range from 100 to 1000 microinches. This, roughly, is the difference between the thickness of a soap bubble and a sheet of aluminum foil, an amount that may seeem negligible but can mean the difference between a near-perfect geometry and an unacceptable one. Ultra-precision embraces the concept of size as well as shape; for example, it is easier to achieve a 10-microinch accuracy on a 1-inch diameter cylinder than on a 3-foot diameter cylinder.

The duplicator lathe servo control system is plagued with the problem of "stick-slip." Stick-slip as used herein refers to the tendency of a movable machine component to require a relatively large force to overcome static friction and put the component in motion from a rest position, and the tendency of the component to move farther than desired because of the inability of the controlling means to reduce the large "starting" force sufficiently fast to that smaller force required to maintain the movement and overcome dynamic friction once the component is in motion. This problem is related primarily to the frictional forces involved. Lubrication experts have found that gas bearings are the most anti-frictional, with liquid bearings being second best. At least one company is known to possess an air bearing for use on machine tools but, as is true with most commercial applications of air or liquid bearings, the load is merly supported as opposed to being rigidly mounted.

Tool positioning at a crossover, wherein the machining operation requires that the hydraulics of the servo system reverse themselves is related to the stick-slip problem. The dimensional accuracy error occurring as a result of the described change in direction is normally greater than 100 microinches. Obviously, this sizeable error is intolerable in ultra-precision machining. Stick-slip appears not only at the crossover, but at every position within the operable range of lathe.

As a general rule, the control ability of even the best hydraulic servo system of a conventional duplicator lathe leaves much to be desired in that the lathe and its servo system are incapable of accuracies better than about 200 micro-inches. This limited ability presumably results from the effects of several factors inherent in the lathe, as designed, for example, relative movement or "slop" between components of the lathe.

Applicant with a knowledge of the problems of the prior art has for an object of his invention the provision of a mounting for a movable tool on a liquid, self-compensated support to overcome random stick-slip forces.

Applicant has as another object of his invention the provision of a mounting for a tool to control its translational or reciprocatory movement.

Applicant has a further object of his invention the provision of a mounting for a tool to control its translational movement while limiting rotational movement with the use of a non-circular piston.

Applicant has as a still further object of his invention the provision of a mounting for a tool adapted to move in accordance with the position of a sensing element which is carried by the mounting in contact with a pattern.

Applicant has as a still further object of his invention the provision of a tool mounting controlled by a high gain servo for X-Y and R-theta types of lathes for accurately positioning a tool with respect to a work piece.

Other objects and advantages of my invention will appear from the following specification and the accompanying drawings and the novel features thereof will be particularly pointed out in the annexed claims.

Figure 2:
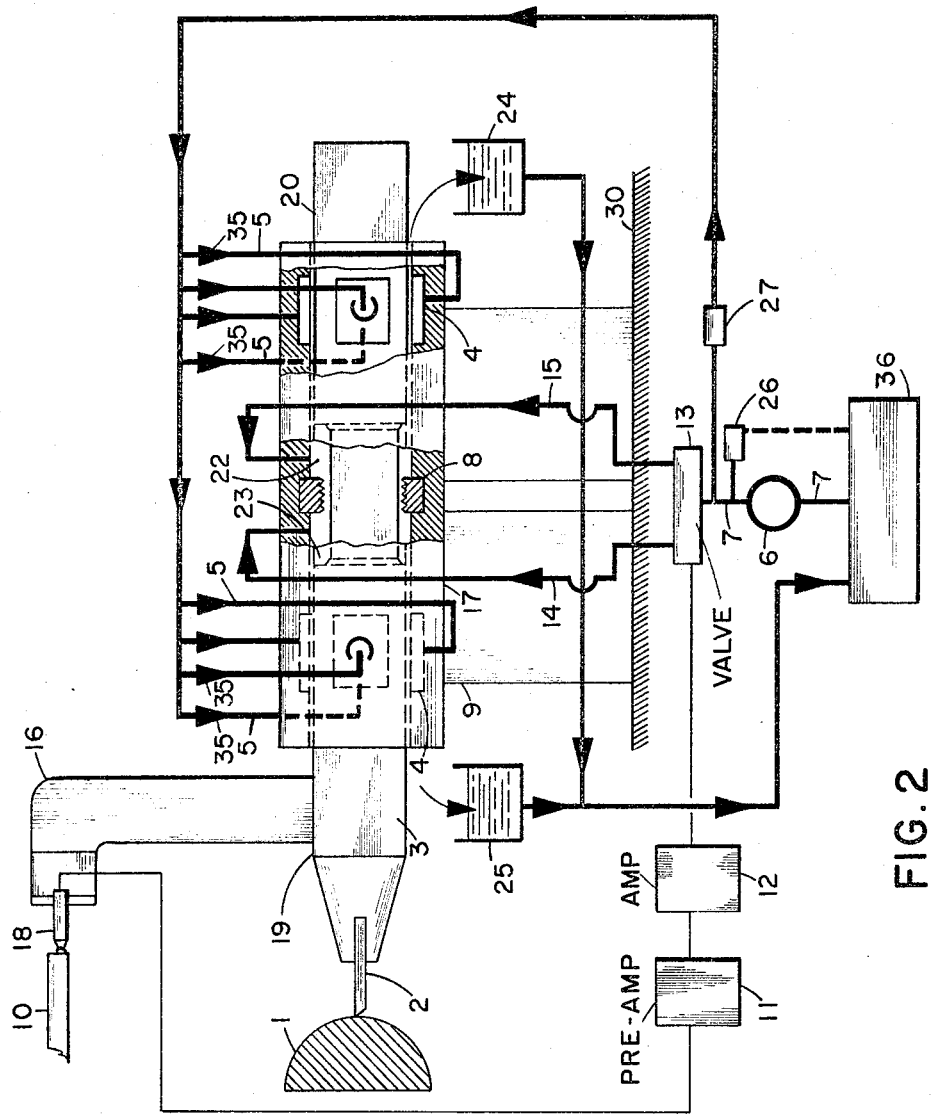
Figure 3:
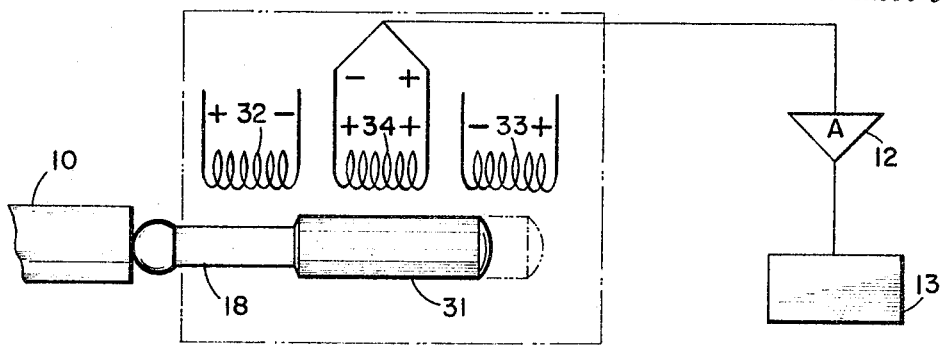
Figure 4:
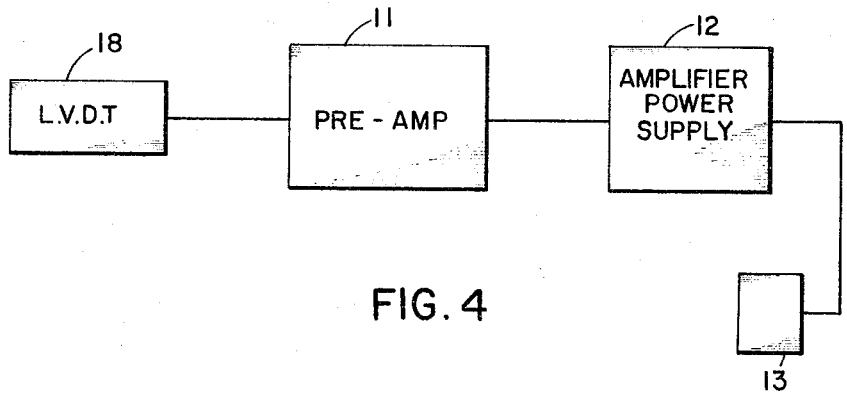
Figure 5:
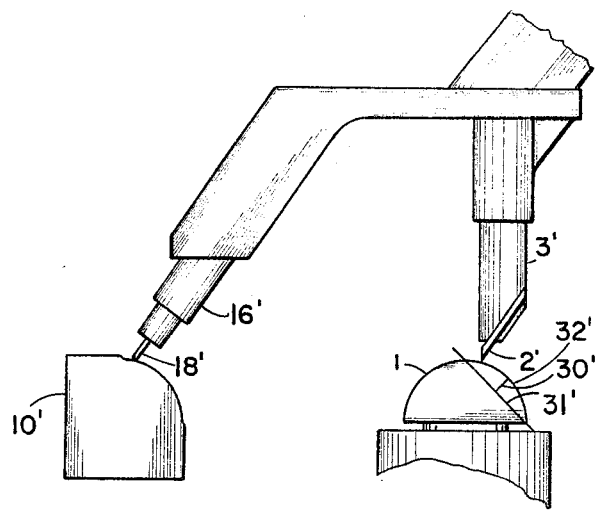

In the drawings, FIG. 1 is a portion of the conventional duplicator type of lathe shown in schematic. FIG. 2 is a schematic of applicant's improved control system incorporated into a conventional duplicator lathe. FIG. 3 is a schematic of a suitable senser. FIG. 4 is a block diagram of the servo control. FIG. 5 is a schematic of a typical arrangement for machining a hemispherical work piece.

The conventional duplicator type lathe of Turchan, 2,603,117 into which applicant's control system has been incorporated, preferably utilizes three carriages: (a) a longitudinal carriage 17', (b) a transverse (cross) slide 28', and (c) a 45° slide 18', as shown in FIG. 1.

The longitudinal carriage 17' is driven mechanically and can only move back and forth along a path parallel to the longitudinal axis of the lathe. The transverse carriage or cross slide 28' also driven mechanically, rides atop the longitudinal carriage but is independently controllable to move along a path perpendicular to the path of the longitudinal carriage. The 45° slide 18' and its associated servo mechanism 68 are positioned adjacent the cross slide. This 45° slide is independently movable at a 45° angle to the lathe spindle axis only, except that it may be moved by the independent or coordinated movements of the longitudinal carriage 17' and the cross slide 28'. The normal procedure for machining hemispheres or the like is to operate the longitudinal carriage and cross slide at constant and equal speeds. Under these conditions a maximum radius part may be machined, the maximum radius being determined by the limits of travel of the various carriages and the chucking capacity of the lathe.

The 45° carriage 30' of the duplicator lathe normally operates on a tracer principle; a first fixed path is followed by a stylus 89 operatively connected to a mechanical or hydraulic servo mechanism (not shown) which causes a machine tool 177, spatially separately from said stylus, to follow a second path identical to said first path. Using this principle the lathe is capable of producing parts at a high rate of output with minimum operator attention and error.

The limit of back-and-forth travel of the 45° slide is equivalent, when machining a hemispherical part, to the mathematical rise 31' between a chord 30', i.e., the distance from equator to pole of part measured in a straight line, and its subtending arc 32', that is, the contour of the hemisphere as indicated in the schematic of FIG. 5 wherein 10' is the template, 1' is the hemispherical work piece, 2' is the tool contacting the work piece 1', and 18' is the stylus contacting the template 10'. In a machining operation wherein the longitudinal carriage and the cross slide travel at equal speeds, the 45° slide assembly is carried in a straight line. Any contour (the arc) must result from back and forth movement of the 45° slide. When machining a hemispherical part on a lathe, normally the cutting tool is moved from the equator of the work piece to the pole, continuously performing a cut on the spinning work piece. In the case under discussion this tool will generate a straight line from said equator to said pole by the combined movements of the longitudinal carriage and the cross slide traveling at equal speeds and without the 45° slide. From the equator to the crossover, the hydraulic servo system of the 45° slide causes the tool to move away from the aforesaid straight line and along a circular path. Upon reaching the crossover, the servo system reverses its force to cause the tool to move toward the line along a continuation of the same circular path.

The degree to which the product contour conforms to the contour of the template, which is, of course, the desired contour, is determined by the tracing capability of the lathe. Specifically, the tracing capability is the ability of the machine to cause the point of contact between tool and work piece to generate a path identical to the contour of the template. Templates can be made to an accuracy of less than 100 microinches, hence are not considered to be a source of error for the purpose of this discussion.

Applicant has employed an entirely different approach in providing a system for positioning the cutting tool along the 45° axis of the lathe. Applicant's system contemplates replacing the 45° slide of X-Y type lathe or it can be applied to a lathe using the R-theta coordinate system. On the R-theta lathe, applicant's system is mounted directly onto the rotary table carried atop the longitudinal carriage.

Referring to the drawings in detail, FIG. 2 is a schematic of a preferred embodiment of applicant's invention and comprises a rigid support 9 carried atop a carriage 30 of a lathe (not shown). Rigidly positioned atop said support is a housing 17, preferably taking the form of a square or rectangular cylinder having a square or rectangular opening therethrough although it may have any suitable non-circular cross section. Received into and encircled by said housing 17 is a double-acting piston member 3, of like cross section, to one end of which is attached a support or arm 16. Support member or arm 16 extends away from, preferably upward and directly over, said housing 17 to positionably support an electronic movement-sensing element 18 such as a conventional LVDT-Linear Variable Differential Transformer made by Sheffield Corporation of Dayton, Ohio, or Pratt and Whitney Company of Hartford, Connecticut, contiguous to a contoured template 10. The LVDT sensing element 18 is coupled through conventional pre-amplifier 11 and power amplifier 12 to valve 13 for converting any electrical signal generated by said LVDT element 18 into an input for the electro-hydraulic servo valve 13, which is of conventional structure such as a electro-hydraulic flow valve Model No. SKO6A1 made by Bendix Corporation, Detroit, Michigan.

Piston member 3, for purposes of illustration, comprises three sections, i.e., a forward section 19, a rearward section 20 and a central section 21. Sections 19 and 20 are preferably of identical square cross section. Section 21 is preferably cylindrical and of a diameter less than a side of either section 19 or 20. Encircling and spaced from section 21 of piston 3, with a radial clearance of about .003″ or .004″ to provide satisfactory restriction of flow and partially embedded within the interior central circumference of said housing 17, is a rigid annular labyrinth (non-contact) seal 8 constructed of any suitable rigid material. Seal 8 divides the space defined by said housing 17 and said reduced section 21 of said piston into two equal annular chambers 22 and 23. Sections 19 and 20 of said piston are, by design, no less than 0.002 inch (on a side) smaller than the interior opening of said housing 17.

Housing 17 is provided with at least eight pressure pockets 4, preferably one pocket per side, with a total of four pockets per each section 19 and 20 of said piston 3. Pockets 4 are preferably rectangular depressions although they may have any suitable configuration. They are formed in the interior surface of said housing 17 and serve to receive and distribute hydraulic fluid. Pump 6 feeds from storage tank 36 through a pressure relief valve 27 to a series of pipes, each of which has an orifice 35 that supplies hydraulic fluid to a pocket 4 under conditions of selected constant pressure, flow and temperature. The orifices 35 are interposed in the individual lines leading to the pockets 4 to produce a pressure drop. As oil flow in the system changes, the pressure drop across the orifice changes so that as the transverse force applied to the tool holder spindle 3 varies, the orifice adjusts the pressure applied in response to oil flow. Thus, the function of pressure adjustment is performed with no moving parts. Pump 6 also supplies hydraulic fluid to the aforesaid servo valve 13 via a line 7. Hydraulic fluid lines 14 and 15 afford hydraulic connections between annular chambers 23 and 22, respectively, and said valve 13. The hydraulic fluid pressures experienced by said pockets 4 and said valve 13 are independent of each other. Catch basins 24 and 25 are provided to receive outflowing hydraulic fluid from which basins the fluid is recirculated to said pump 6 through tank 36.

Referring now to FIG. 3 showing the sensing element 18 and the template 10, when the armature 31 is in rest position, the A.C. voltages which are applied to primary coils 32, 33 in opposition, set up fields which are coupled through the movable magnetic core of armature 31 to the secondary coil 34 to induce equal and opposite E.M.F.'s therein. However, when the surface of the template 10 depresses or displaces the core 31 as indicated in the somewhat exaggerated dotted line position, the coupling between coil 33 and secondary 34 is increased and the coupling between coil 32 and secondary 34 is decreased. This produces a resultant E.M.F. in secondary 34 which is fed to pre-amplifier 11 and from there through power amplifier 12 to the hydraulic valve 13, shifting it to a position to increase fluid flow through line 15 of FIG. 2 and decrease fluid flow through line 14. This causes tool holder cylinder 3 of FIG. 2 to retract or move to the right and carry arm 16 with it. This movement continues until armature core 31 is displaced back to the full line position, and balance is restored in the coupling of coils 32 and 33 to the secondary 34 and null is restored to the system.

In the circuit of FIG. 4, the pre-amplifier may take the form of any suitable conventional pre-amplifier such as a Pratt & Whitney Trans-O-Limit pre-amplifier and indicator and power amplifier 12 may take the form of any suitable conventional power amplifier such as Amplifier and Power Supply Model No. T-6 made by Thompson Controls of Birmingham, Alabama.

In a typical operation of the servo system for positioning a lathe cutting tool, pump 6 is rendered operative and allowed to reach equilibrium with respect to flow, pressure and temperature. Using SAE 10 oils, for example, as the hydraulic fluid, a pressure of 500 p.s.i. is produced by said pump, creating a pad pressure of 300 to 360 p.s.i. As indicated above, an orifice of appropriate size is employed in the piping between pump 6 and each of the pockets 4 to produce the pressure differential and set up a flow value. With a square piston, 3 inches on a side, 24 inches long and weighing about 55 pounds, pressure pads 1 inch wide and 1½ inches long have been found to exert sufficient pressure to produce a film stiffness of 600,000 pounds per inch where the film thickness was 0.002 inch. Film stiffness may be defined as the tendency of the oil film to resist compression, hence is a measure of the ability of the system to support a mass in a desired spatial location while restricting all movements of the mass except for a single translational movement. Typical calculated values of film stiffness in terms of piston deflection are given in Table I. These values were computed as described in publication Y-DA-26, "Mathematical Analysis of Hydrostatic Bearings" by J. B. Richards, April 6, 1962. Tests to evaluate the response of the servo system to longitudinal forces have indicated the system to be capable of positioning the supported piston within ±5 microinches of the desired position. These tests comprised mounting a linear variable differential transformer on the end of the piston, positioning an eccentrically mounted rotating cylinder contiguous to said sensing element 18 and recording the response of said piston as said cylinder was rotated.

TABLE I.—FILM STIFFNESSES, FLOW RATES, AND ORIFICE AREAS FOR DIFFERENT FILM THICKNESSES AND PAD PRESSURES WITH SAE 10 OIL

[(Pump discharge pressure=1500 p.s.i.; oil viscosity =58×10$^{-7}$ pound seconds) inches]

| Oil Film Thickness (inches) | Pad Pressure (p.s.i.) | Oil Flow Rate (in.$^3$/sec.) | Oil Flow Rate (g.p.m.) | Orifice Area (in.$^2$×10$^{-5}$) | Film Stiffness (lbs./in.×10$^{-6}$) |
|---|---|---|---|---|---|
| 0.0021 | 300 | 0.504 | 0.139 | 10.6 | 1.3 |
| 0.0025 | 300 | 0.918 | 0.237 | 18.0 | 1.1 |
| 0.0021 | 400 | 0.717 | 0.185 | 14.7 | 1.6 |
| 0.0025 | 400 | 1.210 | 0.313 | 24.8 | 1.4 |
| 0.0021 | 500 | 0.876 | 0.226 | 19.1 | 1.9 |
| 0.0025 | 500 | 1.482 | 0.383 | 32.3 | 1.6 |
| 0.0021 | 600 | 1.058 | 0.274 | 24.0 | 2.1 |
| 0.0025 | 600 | 1.786 | 0.462 | 40.5 | 1.8 |
| 0.0021 | 700 | 1.223 | 0.316 | 29.4 | 2.3 |
| 0.0025 | 700 | 2.067 | 0.535 | 49.7 | 1.9 |

When the system is in operation, hydraulic fluid is pumped to each of said pockets 4 under sufficient pressure to cause piston 3 to be supported at all points away from the interior wall of housing 17 by a very thin film of flowing fluid. Fluid continually flows from said pump through the pressure differential orifices to the pockets and out through the minute clearance between piston 3 and housing 17. This continuous flow feature provides "friction-free" support to said piston from all sides. Further, this design provides a self-compensating alignment feature which restrains movement of piston 3 in five of the six degrees of freedom of movement. For example, if piston 3 experiences a force tending to displace said piston at an angle to its axis, there is an immediate imbalance of pressures about said piston. The thin film of hydraulic fluid supporting said piston responds exceedingly rapidly to oppose this imbalance because the pressure exerted by the film increases exponentially with its decreasing thickness.

Control of piston movement in the 6th degree of freedom, not affected by pads 4, is by means of the servo system. This servo system, even though integrated into the overall system, operates at least semi-independently of the supported sub-system.

Preferably pump 6 pumps the same type of hydraulic fluid to the electro-hydraulic servo valve 13 as is provided to pads 4 since there will be mixing of the "driving" fluid with the "support" fluid. Valve 13 is a commercial flow control valve Model SKO6A1, Bendix Industrial Controls, Detroit, Michigan, chosen for its durability, reliability, response time, and absence of dead zone. Fluid flows through the servo valve 13, as regulated by the converted electrical signal from LVDT element 18, through lines 14 and 15 to chambers 23 and 22. The flow into said chambers creates pressure therein, the pressure in chamber 22 equalling the pressure in chamber 23 under equilibrium conditions for the system. A change in the pressure within either chamber results in a substantially immediate pressure differential across the seal 8 depending upon the response time of valve 13. Piston 3 responds to the pressure difference across seat 8 set up by control valve 13, and the piston will continue to move as long as the control valve maintains the pressure differential. The control valve has responded to a signal from the LVDT senser 18, which is initiated by a movement of the armature relative to the coil of the LVDT. Piston 3 moves in such a direction as to restore the electrical balance in the LVDT. When electrical balance is restored, equilibrium pressure condition exists in the cylinder. This responsive movement of piston 3 is rapid and has little tendency to over-travel due to the balancing of static and dynamic friction between the piston and its housing achieved by the continuous-flow hydraulic support means. As piston 3 moves, so moves tool 2; therefore, as directed by sensing element 18 so moves tool 2. Any movement of tool 2 not directed by sensing element 18 is movement toward imbalance for which the system possesses self-actuating compensation means.

This arrangement has been described as a means for controlling the cutting tool of a lathe, since this is the preferred application. However, it is emphasized that the basic idea is useful in solving other problems, namely, that of inspection. At the present time, there is no known means for accurately inspecting the dimensions of a work piece without removing the work piece from the machine. By a simple electrical take-off from the electronic sensing means previously described, an "inspection" graph may be made which will be representative of the error sensed and corrected by the system during a machining operation.

Having thus described my invention, I claim:

1. An arrangement for positioning a tool holder to conform to a pattern comprising a housing, a non-circular tool holder positioned in the housing, spaced pockets in the housing positioned around the exterior of the tool holder for receiving liquid, means for supplying liquid under pressure directly to the pockets from an external source for supporting the tool holder in spaced relation to the housing, and tracer means for scanning the pattern to actuate the tool holder in relation to a work piece.

2. An arrangement for positioning a tool holder to conform to a pattern comprising a housing, a non-circular tool holder positioned therein, a series of pockets formed in the housing about the outer surface of the tool holder, means for feeding fluid directly to the pockets from an external source under pressure for hydraulically supporting the tool holder in spaced relation to the housing, a pattern, a scanner for scanning the pattern, and means coupled to the tool holder and responsive to signals from the scanner for hydraulically actuating the tool holder with respect to a work piece.

3. A mounting for a spindle comprising a housing, a spindle non-rotatably mounted in the housing, pockets formed in the housing and spaced about the outer surface of the spindle, means for supplying liquid under pressure directly to the pockets from an external source for movably supporting the spindle in spaced relation to the housing, a pattern, scanning means for scanning the pattern, and a control means connected to the housing and responsive to the scanner for controlling fluid flow to the housing for actuating the spindle in relation to a work piece.

4. A mounting for a spindle comprising a housing, a non-circular spindle passing through the housing constrained against rotation, pockets formed in the housing about the spindle, means for supplying liquid under pressure directly to the pockets from an external source to support the spindle in spaced relation to the housing, a pattern, a scanner for scanning the pattern to produce signals, a source of liquid for hydraulically actuating the spindle, and a control valve responsive to signals from the scanner from controlling fluid flow from the source to actuate the spindle in accordance with the pattern.

5. A mounting for a tool holder comprising a housing for receiving the tool holder, a non-circular tool holder passing through the housing and constrained against rotation, means for supplying fluid directly to the housing from an external source to support the tool holder in spaced relation to the housing, a pattern, a scanner for scanning the pattern, control means responsive to signals from the scanner for actuating the tool holder in relation to a work piece, and means for coupling the tool holder to the scanner and responsive to movement of the tool holder to alter the signals from the scanner.

References Cited by the Examiner

UNITED STATES PATENTS 3,012,575  12/1961  Woody et al. ---------- 92—127
3,014,390  12/1961  Garde et al.

FOREIGN PATENTS 780,360  7/1957  Great Britain.

WILLIAM W. DYER, Jr., *Primary Examiner.*

G. A. DOST, *Assistant Examiner.*